(12) United States Patent  
Carlson et al.

(10) Patent No.: US 8,833,188 B1  
(45) Date of Patent: Sep. 16, 2014

(54) HIGH SPEED PNEUMATIC SIMULATION FACILITY

(75) Inventors: Mark A. Carlson, Amherst, NH (US); Peter D. Bewley, Jr., Merrimack, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 323 days.

(21) Appl. No.: 13/537,219

(22) Filed: Jun. 29, 2012

Related U.S. Application Data

(60) Provisional application No. 61/503,191, filed on Jun. 30, 2011.

(51) Int. Cl.  
*G01N 17/00* (2006.01)

(52) U.S. Cl.  
USPC ........................................................ 73/865.6

(58) Field of Classification Search  
CPC ................... G01N 17/002; G01N 2203/0232  
USPC ........................................................ 73/865.6  
See application file for complete search history.

(56) References Cited

U.S. PATENT DOCUMENTS

| | | | | |
|---|---|---|---|---|
| 3,868,097 A | * | 2/1975 | Taylor | 267/124 |
| 4,624,109 A | * | 11/1986 | Minovitch | 60/648 |
| 8,091,481 B1 | * | 1/2012 | Floyd | 102/377 |
| 8,343,171 B2 | * | 1/2013 | Farritor et al. | 606/130 |

* cited by examiner

*Primary Examiner* — Hezron E Williams  
*Assistant Examiner* — Rodney T Frank  
(74) *Attorney, Agent, or Firm* — Sand & Sebolt; Daniel J. Long

(57) ABSTRACT

A system and method for testing components traveling at high speeds is presented. A system includes an elongated test chamber, high and low pressure reservoirs, a piston and a pressure control system. The elongated test chamber has first and second ends. In some configurations, the test chamber can be a pneumatic cylinder. The high pressure reservoir is connected to the first end of the elongated test chamber and the low pressure reservoir is connected to the second end of the elongated test chamber. The piston travels with a unit under test from the first end of the test chamber to the second end of the test chamber. The pressure control system uses, in part, the low and high pressure reservoirs to dynamically adjust a force profile across the piston as it travels from the first end of the elongated test chamber to the second end of the elongated test chamber.

21 Claims, 3 Drawing Sheets

HIGH SPEED PNEUMATIC SIMULATION FACILITY

CROSS REFERENCE TO RELATED APPLICATION

This application claims priority from U.S. Provisional Patent Application Ser. No. 61/503,191, filed Jun. 30, 2011; the disclosure of which is incorporated herein by reference.

BACKGROUND OF THE INVENTION

1. Field of Invention

The current invention relates generally to apparatus, systems and methods for simulating the use of objects that travel at high speeds. More particularly, the apparatus, systems and methods relate to objects that pass through gasses at high speeds. Specifically, the apparatus, systems and methods provide for simulating different objects such as aircraft, rockets, and or other objects that travel through the atmosphere at high velocities.

2. Description of Related Art

Current simulation systems have been unable to determine all of the limitations and behavioral characteristics of high speed objects and applications such as aircraft and aviation devices. This can lead to an inability to adequately test systems under controlled laboratory conditions prior to expensive flight tests. Excessive flight testing may cause increased risk of failure, high costs, and loss of schedule because of additional re-testing of early risk reduction efforts. It may often be difficult to diagnose and determine the root cause of failures that occur during in flight testing. Misidentified failures may also cause increased technical risk, schedule pressures, and loss of customer trust. Flight testing in inadequately tested aircraft can even be deadly if a key component fails during testing.

The current simulation systems generally cannot create the constant force or ramped force profiles required to emulate the environments that exist while in flight. The current simulation systems are often limited to one quarter of the total necessary force capabilities and cannot achieve the maximum speeds required for failure mode (expected system parasitic) operating conditions. The current system maximum dynamic pressure emulation capability no longer matches the growth in technical capability of the most recent generation of aircraft. A need therefore exists for an updated simulation system capable of the higher maximum load conditions and the complex induced load profiles experienced by current high-speed aircraft.

SUMMARY

According to the present disclosure, a dynamic simulation facility (DSF) includes a pneumatic cylinder. The pneumatic cylinder has a sealable access port close to each end of the cylinder. A piston is placed within the pneumatic cylinder and is useful for mounting test specimens inside the cylinder. The piston is placed between the two sealable access ports within the cylinder. A high pressure source is connected to one access port and is designed to create a high pressure on one side of the piston. A low pressure source is connected to the second access port and is designed to create a low pressure on the other side of the piston. These two pressure sources are designed to work together to create a pressure differential across the piston. The simulation facility also includes a pressure control system designed to control the pressure differential across the piston. A piston stop section is also included within the pneumatic cylinder at the end close to the low pressure source. A data acquisition system is included in the simulation facility and is designed to collect data from test sensors throughout the simulation facility.

The preferred embodiment of the invention includes a system and a method for testing components traveling at high speeds. A system includes an elongated test chamber, high and low pressure reservoirs, a piston and a pressure control system. The piston can be an adjustable mass piston. The elongated test chamber has first and second ends. In some configurations, the test chamber can be a pneumatic cylinder. The high pressure reservoir is connected to the first end of the elongated test chamber and the low pressure reservoir is connected to the second end of the elongated test chamber. The piston travels with a unit under test from the first end of the test chamber to the second end of the test chamber. The pressure control system uses, in part, the low and high pressure reservoirs to dynamically adjust a force profile across the piston as it travels from the first end of the elongated test chamber to the second end of the elongated test chamber.

Another configuration of the preferred embodiment includes a differential pressure control system. The differential pressure control system controls the differential pressure across the piston to generate the desired force profile to act on the unit under test. Additionally, the system can include a flow velocity indicator. The pressure control system can dynamically adjust the force profile across the piston as it travels from the first end of the elongated test chamber to the second end of the elongated test chamber based, at least in part, on an output of the flow velocity indicator.

Other configurations of the system configured as a dynamic simulation facility (DSF) contain other useful components and features. For example, the piston that can be an adjustable mass piston can include piston seals, linear bearings and/or bushings for reducing friction between the piston and the elongated test chamber as the piston moves within the elongated test chamber. The DSF can include a piston stop section at the second end of the elongated test chamber to slow and passively stop the piston so that the piston can be reused. The piston stop section can also include frangible material configured to stop the unit under test in the event that the unit under test fails during a test. The elongated test chamber can include a breech/piston loading section near its first end that creates a high side pressurization port to allow the piston to be loaded into the elongated test chamber.

Another configuration of the preferred embodiment is a method of simulating objects traveling at a high rate of speed. The method includes generating a low pressure and generating a high pressure. The method applies the high pressure to a first end of an elongated test chamber and applies the low pressure to a second end of the elongated test chamber. The method causes a unit under test in the test chamber to travel from the first end of the elongated test chamber to the second end of the elongated test chamber by dynamically controlling a force profile acting on the unit under test while the unit moves from the first end of the elongated test chamber to a second end of the elongated test chamber. In another configuration of this embodiment, the method can determine an unsafe linkage failure based, at least in part, on the velocity data. When an unsafe linkage failure is detected, the method can slow down the unit under test before it reaches the second end of the elongated test chamber.

BRIEF DESCRIPTION OF SEVERAL VIEWS OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
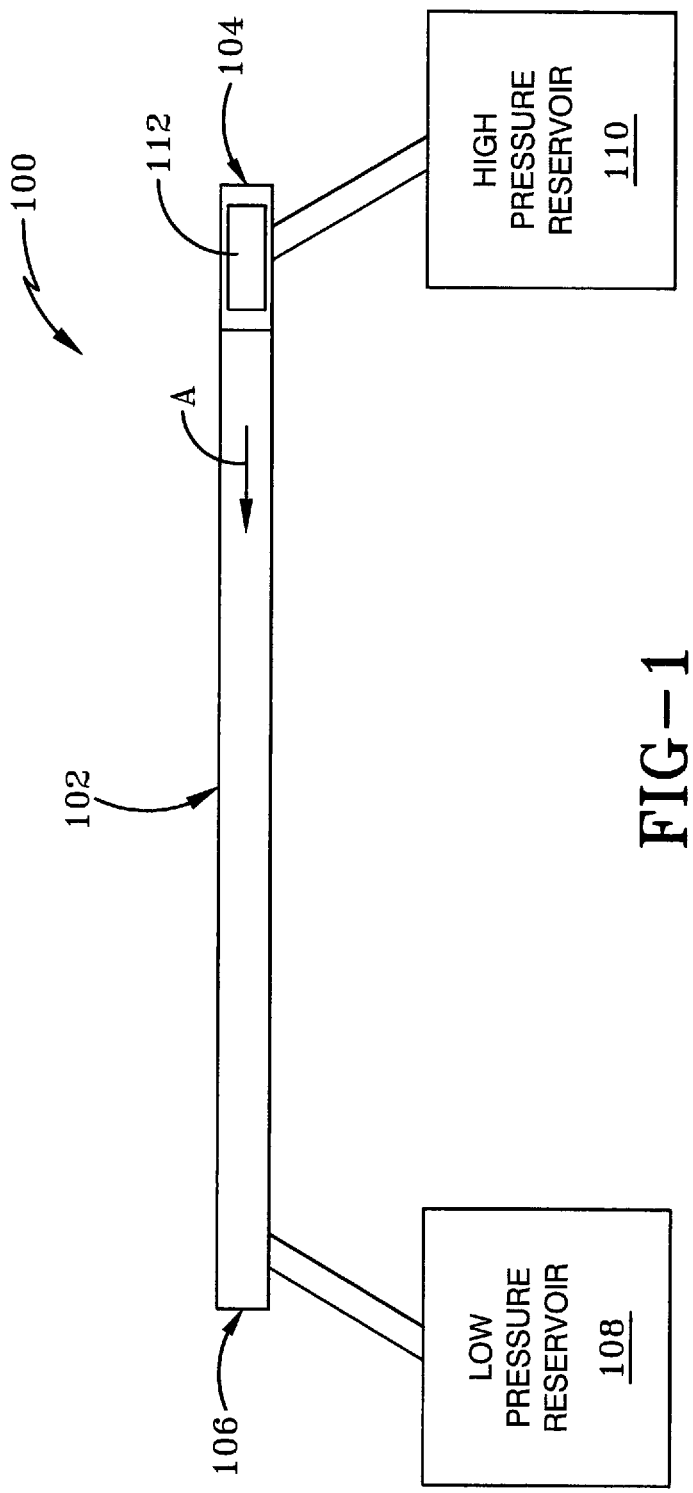
FIG. 1 illustrates a preferred embodiment of a system for testing high speed devices.

FIG. 1 illustrates an example preferred embodiment of a system 100 that is a dynamic simulation facility (DSF) for testing of high speed devices. This system 100 has an increased capability in the simulation of an environment that modern high speed devices operate. Increase capability in simulation systems up to forces representative of the final environment will allow more complete characterization of high speed objects prior to field testing. Additional capability may allow for testing system margins and for growth in system capabilities, new system designs, and increased cyclic throughput due to reserve capacity. Additional capability may ensure that system limitations and margins can be determined prior to expensive field testing. Potential benefits include the reduction of technical risk afforded by more thorough test capability as well as a reduction in overall cost by reducing dependence on flight testing.

The DSF of the system 100 of FIG. 1 includes an elongated cylinder 102 with a first end 104 and a second end 106, a low pressure reservoir 108 and a high pressure reservoir 110. The high pressure reservoir 110 is connected to the first end 104 of the cylinder 102 and the low pressure reservoir 108 is connected to the second end 106 of the cylinder 102. As discussed in more detail later, the high pressure reservoir 110 and the low pressure reservoir 108 can be used to create and to control a dynamic force/pressure profile across a piston 112 that has been loaded in the elongated cylinder 102. The force profile can be controlled to cause the piston 112 to rapidly travel from the first end 104 of the cylinder 102 in the direction of arrow A to its second end 106. The system 100 of FIG. 1 allows the testing of any high speed device, for example aircraft components, as they rapidly travel from the first end 104 of the cylinder 102 to the left end 106 of the cylinder 102.

The system 100 of FIG. 1 illustrates the major components of a DSF that moves from the traditional vacuum induced force profile to a new construct that enables the force profile to be dynamically adjusted to compensate for test, system, and failure induced fluctuations more representative of actual system employment. The system is preferably designed as a single cylinder, single piston, dynamic, force control actuator.

The DSF may operate across a speed range from 0 to the choked flow point of the pneumatic cylinder. The choked flow condition is estimated at a maximum of 1100 ft/s [Mach 1] in current embodiments. In a preferred embodiment, the DSF is used for testing high speed aircraft or aircraft devices, but the DSF can be used for testing any system that will be exposed to high speeds.

Figure 2:
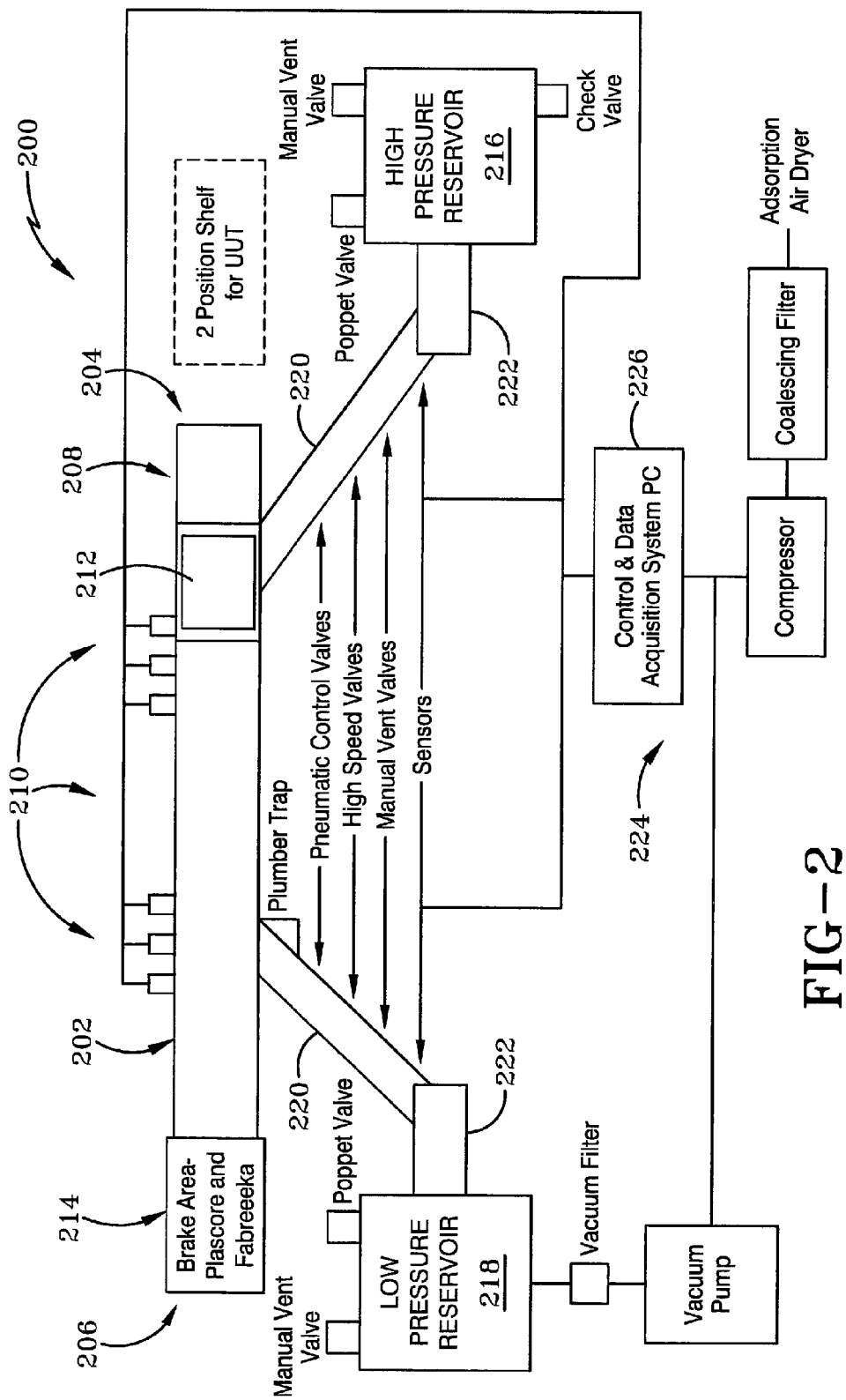
FIG. 2 illustrates another configuration of the preferred embodiment as a system that is a dynamic testing facility (DSF) for testing high speed devices.

Referring now to FIG. 2, a more detailed illustration of a dynamic simulation facility (DSF) 200 is shown. The DSF again includes an elongated cylinder 202 with a first end 204 and a second end 206. In the preferred embodiment, the cylinder 202 is a pneumatic cylinder. In one embodiment the cylinder 202 is about 340 feet long with a four inch inner diameter. The cylinder 202, however, could be designed to virtually any length or width, thus accommodating varying system design needs as required. A breech/piston loading section 208, may be included in the pneumatic cylinder 202, creating a high side pressurization port and removable high side cylinder seal with a low leak rate. A test section 210, in which pressure differential across a piston 212 is controlled, comprises the main length of the pneumatic cylinder 202.

A piston stop section 214 is located at the second end 206 of the cylinder 202 and includes a removable low side pressure seal. The stop mechanism 214 may be a frangible material for emergency stop in the event of failure of the primary mechanism under test. The low side piston stop 214 is designed to passively stop or slow the piston motion to allow safe recovery and reuse of the piston and protect personnel and property in the event of failure.

As understood by those of ordinary skill in the art, the piston 212 can be an adjustable mass piston. The piston can further include piston seals and linear bearings or bushings to reduce sliding friction within the pneumatic cylinder 202. The piston 212 may include an attachment mechanism for mounting a test specimen to the piston 212.

A high side pressure reservoir 216, and a low side pressure reservoir 218 provide the pressure differential across the adjustable mass piston 212. High and low side pressure control valves 220, and isolation valves 220 may be connected to the high pressure reservoir 216 and the low pressure reservoir 218. Pressure sensors and over-pressure safety valves may be installed to both reservoirs 216, 218.

A differential pressure control system 224 may accurately control the differential pressure across the piston 212 to generate the desired force level or force profile in the test specimen linkage. For example, as previously tested in a working system at BAE Systems, Inc., the differential pressure control system may 224 also accurately control the force generated by the piston 212 across a speed range of 0 to 750 ft/s. The force control accuracy can be reduced for piston speeds from 750 ft/s to 1100 ft/s, the choked flow point. Of course, other embodiments and configurations of the system 200 can generate other forces that are greater or less than the examples given above to propel the piston 212 to greater or lesser velocities.

A flow velocity sensor may be used to improve the pressure control loop. The flow velocity sensor output may also be integrated to estimate the position of the piston in the cylinder 212 in the absence of position sensor feedback. Any difference between the sensor feedback and the position and/or velocity estimates may be used to determine system failure for system safety shut down.

In other configuration the system 200 can include other useful components and other features. For example, the system 200 can include a data acquisition system 226 that can collect high speed data from analog and digital auxiliary sensors. A piston retrieval and cool down box may be incorporated within the system, along with system coordination and control hardware and software. The DSF may also include a variable flow orifice to the upstream control end, thereby adjusting the maximum conditions for performance and further enhancing capability. The variable flow orifice can be part of a removable assembly at the high pressure end 204 of the pneumatic cylinder that allows use of the system as a variable nozzle controlled wind tunnel. The use of a variable nozzle can extend performance of the system to inlet conditions beyond a sonic limit.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 3:
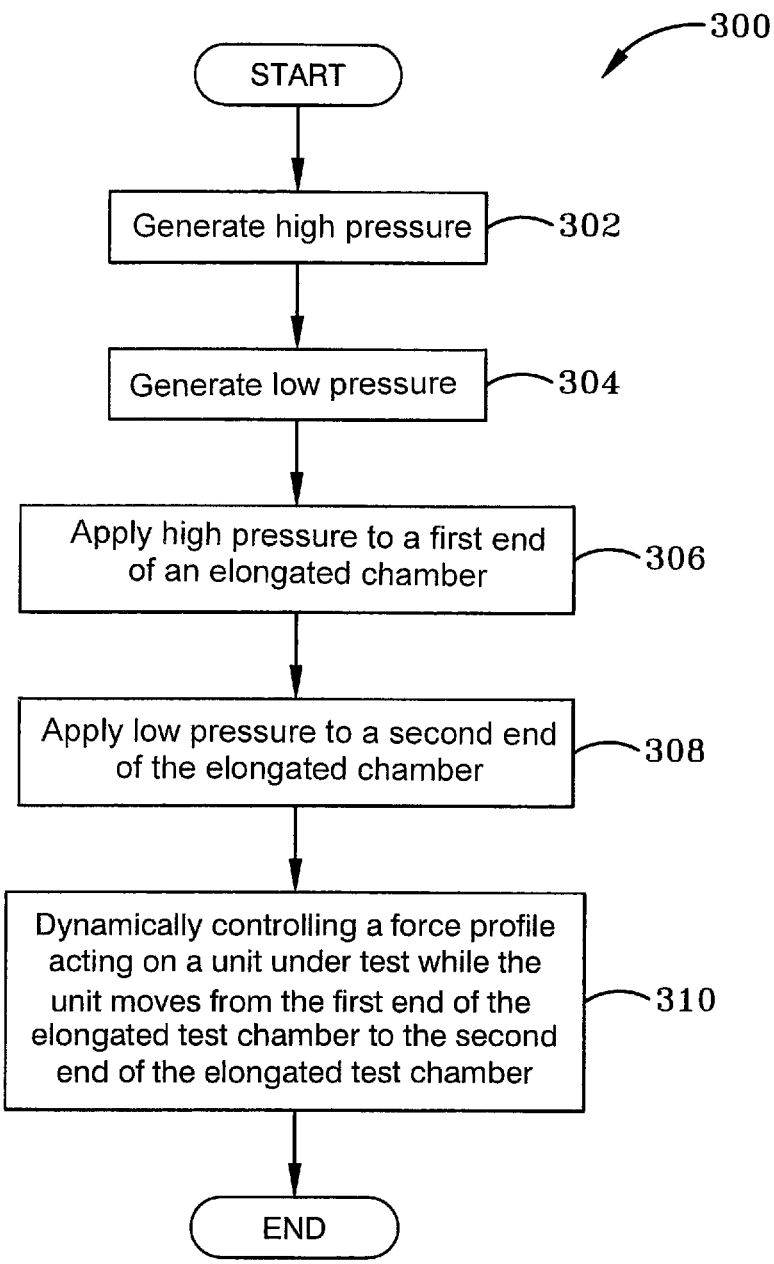
FIG. 3 illustrates an embodiment of the preferred embodiment that is a method of dynamically testing devices or components that travel at high speeds.

FIG. 3 illustrates a method 300 of simulating objects traveling at a high rate of speed. The method 300 includes generating a high pressure, at 302, and generating a low pressure, at 304. The high pressure is applied, at 306, to a first end of an elongated test chamber. The elongated test chamber can be formed with a pneumatic cylindrical tube. The low pressure is applied, at 308, to a second end of the elongated test chamber. The method 300 causes, at 310, a unit under test in the elongated test chamber to travel from the first end of the elongated test chamber to the second end of the elongated test chamber by dynamically controlling a force profile acting on the unit under test while the unit moves from the first end of the elongated test chamber to a second end of the elongated test chamber.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

What is claimed is:

1. A system for testing components that travel at high speeds comprising:
    an elongated test chamber with a first end and a second end;
    a high pressure reservoir connected to the first end of the elongated test chamber;
    a low pressure reservoir connected to the second end of the elongated test chamber;
    a piston configured to travel from the first end of the elongated test chamber to the second end of the elongated chamber, wherein the piston is configured to transport a unit under test through the elongated chamber; and
    a pressure control system configured to use, at least in part, the low pressure reservoir and the high pressure reservoir to dynamically adjust a force profile across the piston as it travels from the first end of the elongated test chamber to the second end of the elongated chamber.

2. The system for testing components that travel at high speeds of claim 1 further comprising:
    a differential pressure control system configured to control the differential pressure across the piston to generate the desired force profile to act on the unit under test.

3. The system for testing components that travel at high speeds of claim 1 further comprising:
    a flow velocity indicator, wherein the pressure control system is configured to dynamically adjust the force profile across the piston as it travels from the first end of the elongated test chamber to the second end of the elongated test chamber based, at least in part, on an output of the flow velocity indicator.

4. The system for testing components that travel at high speeds of claim 1 further comprising:
    an elongated cylinder forming the elongated test chamber.

5. The system for testing components that travel at high speeds of claim 4 wherein the elongated cylinder is an elongated pneumatic cylinder.

6. The system for testing components that travel at high speeds of claim 1 wherein the piston is an adjustable mass piston.

7. The system for testing components that travel at high speeds of claim 6 wherein the adjustable mass piston further comprises at least one of the group of: piston seals, linear bearings and bushings for reducing friction between the piston and the elongated test chamber as the piston moves within the elongated test chamber.

8. The system for testing components that travel at high speeds of claim 1 further comprising:
    a piston stop section at the second end of the elongated test chamber configured to slow and passively stop the piston so that the piston can be reused.

9. The system for testing components that travel at high speeds of claim 8 wherein the piston stop section further comprises:
    frangible material configured to stop the unit under test in the event that the unit under test fails during a test.

10. The system for testing components that travel at high speeds of claim 1 further comprising:
    a breech/piston loading section near the first end of the elongated test chamber creating a high side pressurization port configured to allow the piston to be loaded into the elongated test chamber.

11. The system for testing components that travel at high speeds of claim 1 further comprising:
    a poppet valve on the high pressure reservoir configured to automatically regulated a pressure inside the high pressure reservoir.

12. The system for testing components that travel at high speeds of claim 1 further comprising:
    a plurality of replacement pressure transducers spaced along a length of the elongated test chamber, wherein the pressure control system is configured to dynamically adjust the force profile across the piston as it travels through the elongated test chamber based, at least in part, on controlling the plurality of replacement pressure transducers.

13. The system for testing components that travel at high speeds of claim 1 further comprising:
   a variable flow orifice at the first end of the elongated test chamber configured to extend performance of the system to propel the piston beyond sonic speeds.

14. A method of simulating objects traveling at a high rate of speed comprising:
   generating a low pressure;
   generating a high pressure;
   applying the high pressure to a first end of an elongated test chamber;
   applying the low pressure to a second end of the elongated test chamber; and
   causing a unit under test in the elongated test chamber to travel from the first end of the elongated test chamber to the second end of the elongated test chamber by dynamically controlling a force profile acting on the unit under test while the unit moves from the first end of the elongated test chamber to the second end of the elongated test chamber.

15. The method of simulating objects traveling at a high rate of speed of claim 14 further comprising:
   Determining a velocity data and wherein the dynamically controlling a force profile acting on the unit under test further comprises:
   dynamically controlling a force profile based, at least in part, on the velocity data.

16. The method of simulating objects traveling at a high rate of speed of claim 15 further comprising:
   determining an unsafe linkage failure based, at least in part, on the velocity data; and
   slowing down the unit under test before the unit under test reaches the second end of the elongated test chamber when an unsafe linkage failure is detected.

17. The method of simulating objects traveling at a high rate of speed of claim 16 further comprising:
   estimating a position of the unit under test within the elongated test chamber based, at least in part on the velocity data; and
   wherein the determining an unsafe linkage failure based, at least in part, on the position.

18. The method of simulating objects traveling at a high rate of speed of claim 14 further comprising:
   passively causing the unit under test to come to a stop before the unit under test reaches the second end of the elongated test chamber.

19. The method of simulating objects traveling at a high rate of speed of claim 14 further comprising:
   mounting the unit under test onto a piston and wherein the applying the high pressure to a first end of an elongated test chamber further comprises:
   applying the high pressure to a first side of the piston; and wherein the applying the low pressure to a second end of the elongated test chamber further comprises:
   applying the low pressure to a second side of the piston.

20. The method of simulating objects traveling at a high rate of speed of claim 14 further comprising:
   retrieving the piston from the second end of the elongated test chamber;
   reusing the piston by attaching a new unit under test to the piston;
   reloading the piston into the first end of the elongated test chamber; and
   moving, for a second time, the piston from the first end of the elongated test chamber to a second end of the elongated test chamber a second time by dynamically controlling a force profile acting on the unit under test while the unit moves through the elongated test chamber.

21. A simulation facility for the controlled laboratory testing of high-speed aircraft and aircraft devices comprising:
   a pneumatic cylinder having a first and a second sealable access port near the opposing ends of the pneumatic cylinder;
   a piston for mounting a test specimen disposed within the pneumatic cylinder between the first and second sealable access ports;
   a high pressure source connected to the first sealable access port of the pneumatic cylinder configured to create a high pressure on one side of the piston;
   a low pressure source connected to the second sealable access port of the pneumatic cylinder and configured to create a pressure differential across the piston;
   a pressure control system connected to the high pressure source and the low pressure source and configured to control the pressure differential across the piston.

* * * * *